Nov. 9, 1965 P. R. SZASZ 3,216,640

"BIRD-BEAK" WIRE BONDING INSTRUMENT FOR THERMOCOMPRESSIVELY SECURING LEADS TO SEMI-CONDUCTOR DEVICES

Filed March 8, 1963 8 Sheets-Sheet 1

INVENTOR.
PETER R. SZASZ

BY

Bilker & Mayerman

ATTORNEYS

INVENTOR.
PETER R. SZASZ
BY
Bilker & Mozerman
ATTORNEYS

INVENTOR.
PETER R. SZASZ
BY
ATTORNEYS

INVENTOR.
PETER R. SZASZ
BY
Bilker & Mayerman
ATTORNEYS

INVENTOR.
PETER R. SZASZ
BY
Bilher & Moyerman
ATTORNEYS

INVENTOR.
PETER R. SZASZ
BY
Bilher & Mergerman
ATTORNEYS

INVENTOR.
PETER R. SZASZ
BY
Bilker & Moyerman
ATTORNEYS

INVENTOR.
PETER R. SZASZ
BY
Bilker & Mayerman
ATTORNEYS 3,216,640

"BIRD-BEAK" WIRE BONDING INSTRUMENT FOR THERMOCOMPRESSIVELY SECURING LEADS TO SEMI-CONDUCTOR DEVICES

Peter R. Szasz, Philadelphia, Pa., assignor to Kulicke and Soffa Manufacturing Company, Fort Washington, Pa., a corporation of Pennsylvania Filed Mar. 8, 1963, Ser. No. 263,841
14 Claims. (Cl. 228—3)

This invention relates to a bonding instrument for thermo-compressively securing fine wire leads to semi-conductor devices, and more particularly relates to an instrument in which the wire is automatically dispensed from a spool, bonded to the semi-conductor devices, and thereafter severed in a predetermined sequence of programmed operations.

In the manufacture of transistors and microcircuit devices, fine lead wires of precious metals, such as gold and silver, and other metals, such as aluminum, are secured to minute metallized areas on semi-conductor wafers of germanium, silicon, and the like. The lead wire is thereafter bonded to terminal posts on the elements, called "headers," to which the wafer "dice" themselves also are mounted, in order to complete the circuitry. The metallized areas are defined in many and various geometric patterns in the form of stripes, dots, circles, horseshoes, etc., depending upon the desired characteristics of the completed semi-conductor device. Sometimes, the sequence of operations requires that a lead be bonded to a particular wafer indicia and coupled to an elevated post followed by wire cut-off (dice-to-post bond). Sometimes it is desirable that the lead be first bonded to the post and then coupled to the slightly lower wafer geometry (post-to-dice bond). At still other times, a plurality of individual wafer designs are coupled together by a series of "stitch" bonds before cut-off to the wire lead is accomplished.

In recent years, it has become increasingly necessary to resort to finer gauge lead wire (.0004" to .0007") in order to yield the higher frequency performance required of present day semi-conductor circuits. At the same time, the vibrational, shock and "G" load stresses imposed by modern rockets and astronautical vehicles upon the navigational, communicational and electronic metering equipment carried therein have all necessitated a strengthening of the bonds even in the delicate transistor and microcircuit leads. It is apparent that the rupture of but a single bond could critically affect or doom an entire mission to failure.

In the past, the means for thermocompressively securing the leads were by (1) wedge bonding and (2) by nail head or ball bonding. With wedge bonding, a wedge-shaped tool or blades was pressed against the wire in contact with the semi-conductor transverse to the wire axis. This type of bonding has the inherent disadvantage of micropositioning two elements into precise location. First the wire end had to be manipulated to its position on the semi-conductor, and second, the wedge tool had to be positioned over and against the wire. This has proved to be a time-consuming operation. Furthermore, the area of the bond was small, and hence weak, since it was governed by the zone of contact of the end-radiused blade. Moreover, the cut-off pressure was often damaging to the semi-conductor component and therefore required that the lead wire be extended and bonded to a post prior to cutting.

In ball-bonding, a capillary was lowered against ball flame-formed on the end of the wire depending therethrough. Since the wire was carried by the capillary itself and capillary also used as the bonding tool, a considerable speed-up in bonding operation was afforded inasmuch as only a single element had to be manipulated. When the capillary was depressed into contact with the ball against the heated surface, the ball became deformed into the characteristic "nail-head" shape. An inherent disadvantage of nail-head bonding was the circular cross-section of the bond itself which frequently "shorted-out" the adjacent-spaced indicia, for example where the geometry consisted of a pair of parallel stripes, possible .001" by .05" and spaced from each other by .001". Another difficulty encountered with nail-head bonding devices was the critical nature of flame-forming the ball. Still another problem was the additional time consumed in both severing the wire and forming the ball by the transversing flame. Yet another disadvantage of ball-bonding is the wire tab left at the end of the lead which must be mechanically severed since the flame could not be placed too close to the bond. In addition, the edge of the capillary was used as a wedge bonding tool in order to lead-couple geometry and the wafer itself, i.e. "stitch bonding." However, since the wedge bond has a smaller contact area, there was resultant sacrifice in bonding strength. Lastly, the nail-head bonding sequence required bonding first to the wafer and then to the post in the usual program of joining an element on the dice with the terminal post.

The present invention is concerned with a thermo-compression bonding instrument whose tool acts as a die in deforming the lead wire at the bond to the shape of the die. In particular, the bonding tool or jewel has a groove at its lower end for receiving the wire and flat surfaces or lands on opposite sides of the groove. When the tools is depressed and urged by pressure toward a heated surface, the portion of the wire extending below the tool is flattened and flows outwardly beneath the lands. Further application of pressure causes the wire to exude laterally and enables the bonded area to reach the full width of the lands. A guide element in the shape of a wedge tool or jewel is positioned against the side of the bonding jewel and slidably retains wire dispensed from a spool or the like in alignment with the groove of the bonding tool. The angular configuration in which the guide jewel is oriented with the bonding jewel and the characteristic tool motion of the hereinafter described bonding instrument makes the name "bird-beak" bonder appropriate to define the tool shape and mode of operation.

Thus, the bird-beak tool can provide a long and narrow wire bond whose area of contact can be controlled to be greater that provided by any previously employed fine wire bonding system, and hence yield a bond of greater strength. In addition, the bird-beak tool affords bonds of equal area at either the wafer or the post. The order of applications of successive bonds can either be wafer-to-post or post-to-wafer or a plurality of stitch bonds to the wafer since the cut-off can be performed at either the wafer or the post as desired. Programming enables the machine to take over control of most of the bonding variables from the operator. This includes a smooth severing motion that takes advantage of the wire's weakest cross-section which is located immediately adjacent the bond. Furthermore, because no flame-off is required at severance of the wire nor is there any need to form balls at the wire end, successive bonds can be performed rapidly, and uniformly and thereby increase the speed of semi-conductor fabrication. Moreover, the cut-off of a bird-beak bond can be accomplished without leaving a tab with consequent reduction of "shorting" probability.

It is therefore an object of this invention to provide a high-speed wire bonding instrument for thermocompressively securing leads to semi-conductor devices.

Another object of this invention is to provide a fine wire bonding instrument which will yield bonds of greater area, and hence of greater strength.

Another object of this invention is to provide a thermocompressure lead bonding instrument which will handle wire diameters of from .0004 inch to .003 inch with equal facility, efficiently and with great speed.

Still another object of this invention is to provide a fine wire bonding instrument which will accomplish a wafer-to-post bonding sequence, a post-to-wafer bonding sequence, or a series of wafer stitch bonding operations in any order desired.

Yet another object of this invention is to provide a wire bonding instrument in which the lead wire can be easily cut-off immediately adjacent to the bond without leaving a tab or without damaging the wired device.

A further object of this invention is to provide a deadweight wire bonding system which has minimum frictional effects that would likely interfere with bonding consistency or produce failures in the wire being dispensed.

A still further object of this invention is to provide a fine wire bonding instrument in which the sequence of operation may be automatically programmed so that the bonding will be performed consistently and rapidly without requiring operator discretion.

Another object of this invention is to provide a wire bonding instrument in which the shape of the bond for individual applications can be controlled.

Another object of this invention is to provide a fine wire bonding instrument in which an automatic cut-off operation can be performed either on the terminal post or on the wafer.

Another object of this invention is to provide a fine wire bonding instrument in which the bonding and cut-off can be accomplished automatically or manually.

Still another object of this invention is to provide a fine wire bonding instrument whose operation is well adapted for a short training period of the operator.

Other objects of this invention are to provide an improved device of the character described that is easily and economically produced, which is sturdy in construction, and which is highly efficient and effective in operation.

With the above and related objects in view, this invention consists of the details of construction and combination of parts as will be more fully understood from the following detailed description when read in conjunction with the following drawing in which.

Figure 1:
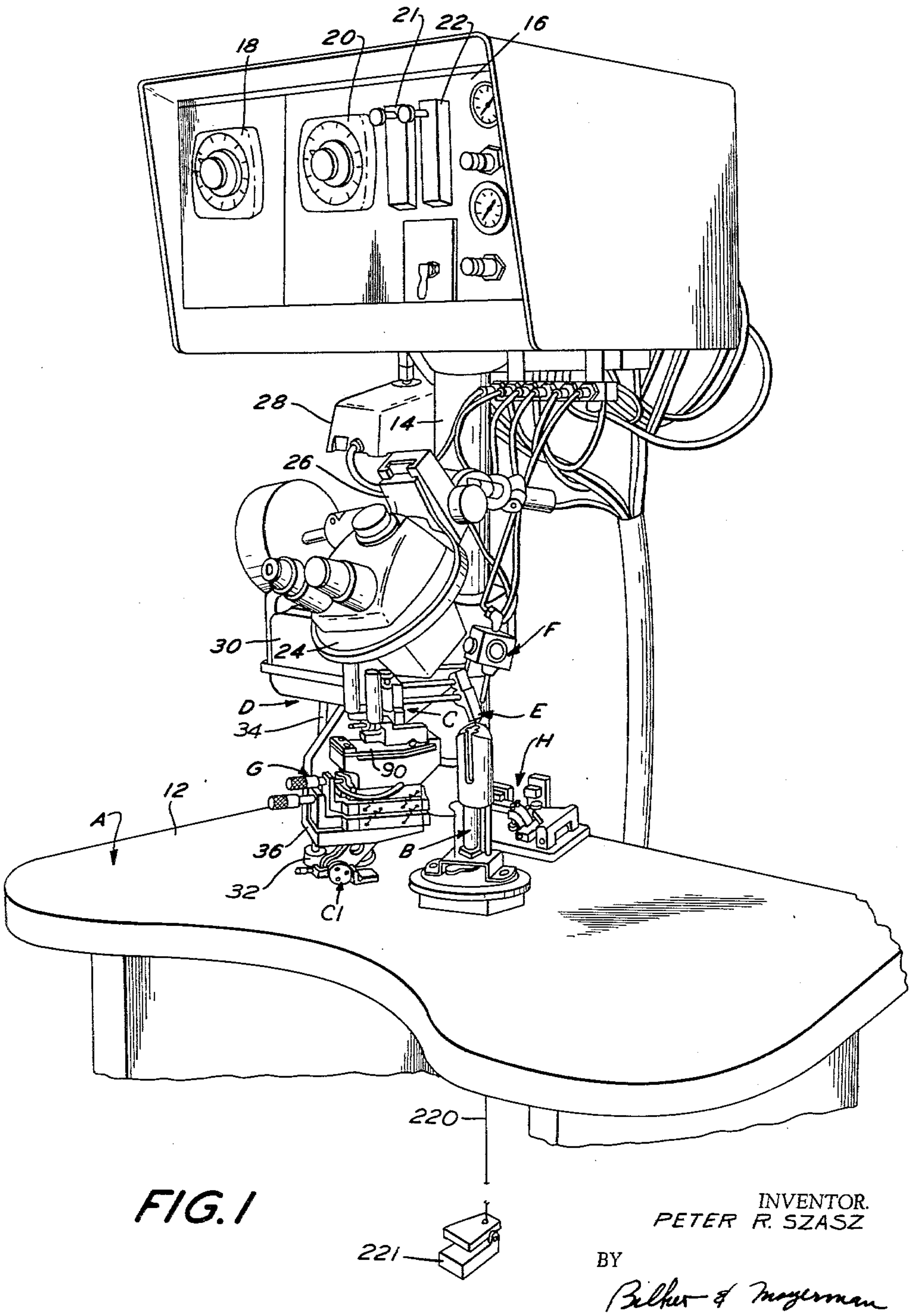
FIGURE 1 is a perspective view of a thermocompression lead wire bonding instrument embodying this invention.

Referring now in greater detail to the drawings in which similar reference characters refer to similar parts, there is shown a bonding instrument for thermocompressively securing lead wire to semi-conductor devices comprising a frame, generally designated as A, a heating platform B for holding the semi-conductive devices in position, a bonding head C vertically reciprocable in the frame, manipulating means D for micropositioning the bonding head in a horizontal plane simultaneously along X- and Y-axes, a bonding tool E mounted in the bonding head, and a dispenser F for feeding wire from a spool to the bonding tool. Also incorporated as an integral part of the instant invention is a laterally shiftable platform G which after a bond has been made at a first point in the semi-conductor device automatically drives the bonding head C a predetermined distance along a horizontal line to a second point thereon, and programming means H for automatically stepping the bonding head C through a predetermined cycle.

The frame A includes a base or table top 12 having a column 14 upwardly extending therefrom and supporting a control console module 16. The control module 16 contains internally the various electrical, air, and gas control components for actuating the system. Automatic timers 18 (dice) and 20 (post) are conveniently located on the face of the module panel for setting the desired bonding period of the lead wire to the wafer and the terminal post respectively of the semi-conductor device X. Suitable flow meters 21 and 22 are also mounted on the panel face 16 for adjustment of the flow of forming or reducing gas to the heat platform B and the gas flow to the wire dispenser F.

The manipulator D upon which the bonding head C is mounted, is adjustably affixed to the column 14 by suitable brackets (not shown). A stereo microscope is 24 hingedly supported upon a pod 26 which is clamped at the upper portion of the manipulator housing so that the operator may conveniently swing the bonding head C to a position over the semi-conductor X mounted at the top of the heat platform B. A suitable illuminator 28 directs a beam of light upon the surface of the semi-conductor wafer so that the entire wire bonding operation may be conveniently observed under three-dimensional magnification.

Figure 3:
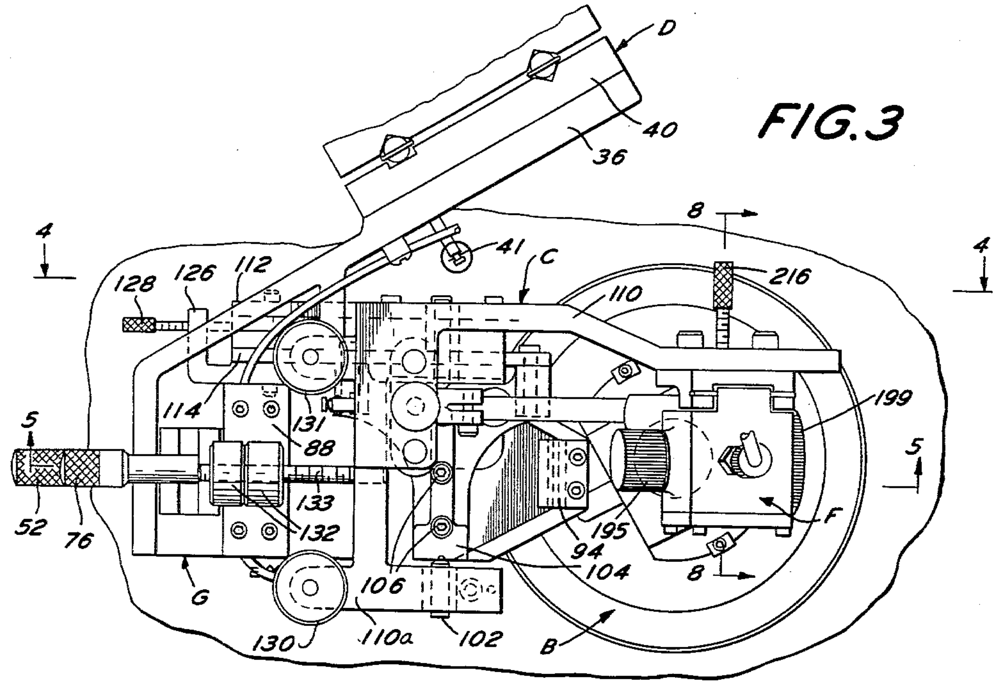
FIGURE 3 is a top plan view of a bonding head embodied in this invention.

The manipulator D comprises a micropositioning assembly substantially identical to that fully shown and described in U.S. Patent No. 3,149,510, for an invention by Frederick W. Kulicke, Jr. in "Fine Wire Manipulator and Bonding Instrument for Transistors." Sliders (not shown) in the manipulator housing 30 are coupled to a fingerpiece 32 by a downwardly depending rod 34 which is retained in universal bearings in both the sliders and the fingerpiece. Horizontal positioning or movement of the fingerpiece 32, called a "chessman," upon the surface of the table top 12 transmits a proportionally reduced movement in the corresponding horizontal X- and Y-axes through the sliders to a mounting bracket 36 which supports both the automatic horizontal drive positioner G and the bonding head C. The support bracket 36 is substantially L-shaped in plan configuration and is secured to the face of a vertically disposed slider plate 40 of the manipulator D, as shown in FIGURE 3. Thus, the operator can by manipulation of the chessman 32 upon the surface of the table top 12 position the bonding tool E to an exact point above the semi-conductor device X in the heat platform B preparatory to performing the wire bonding operations.

The heating platform B comprises a pedestal 42 which is secured to the table top 12 and a post 44 to the upper portion of which is mounted a platen 46. See FIGURES 2 and 4. The platen 46 contains a heating element (not shown) and an internal thermocouple which are connected to the control panel 16 through leads 47. The semi-conductor device X is mounted under a bonnet and resiliently retained in position with its face exposed for securing thereto of bonding leads, all as fully described and shown in the afore mentioned U.S. Patent No. 3,149,510. A supply of forming gas or nitrogen flows from under the bonnet to blanket the semi-conductor device with a reducing atmosphere thereby preventing oxidation of any of the transistor or microcircuit components when bonding temperatures are imposed.

It is also to be observed that a multi-place heat platform, may be employed such as is shown and described in U.S. Patent application, Serial No. 254,721, filed January 29, 1963, for an invention by Thomas L. Angelucci and Frederick W. Kulicke, Jr. in "Nail Head Bonding Apparatus for Thermocompressively Securing Lead Wire to Semiconductor Devices," wherein a rotating platform is adapted to hold a plurality of semi-conductor devices for successive application of leads.

Figure 2:
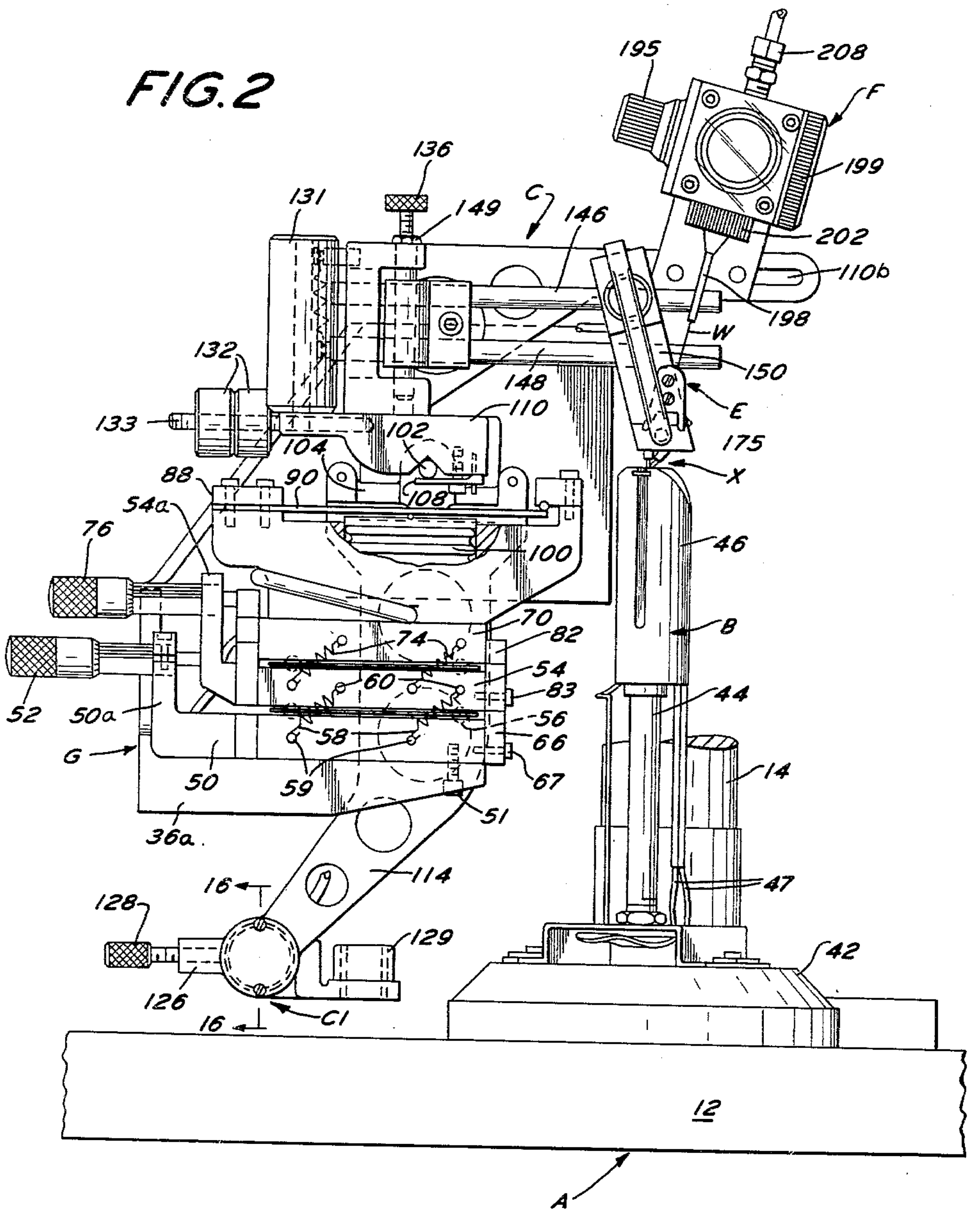
FIGURE 2 is an elevational view thereof.
Figure 4:
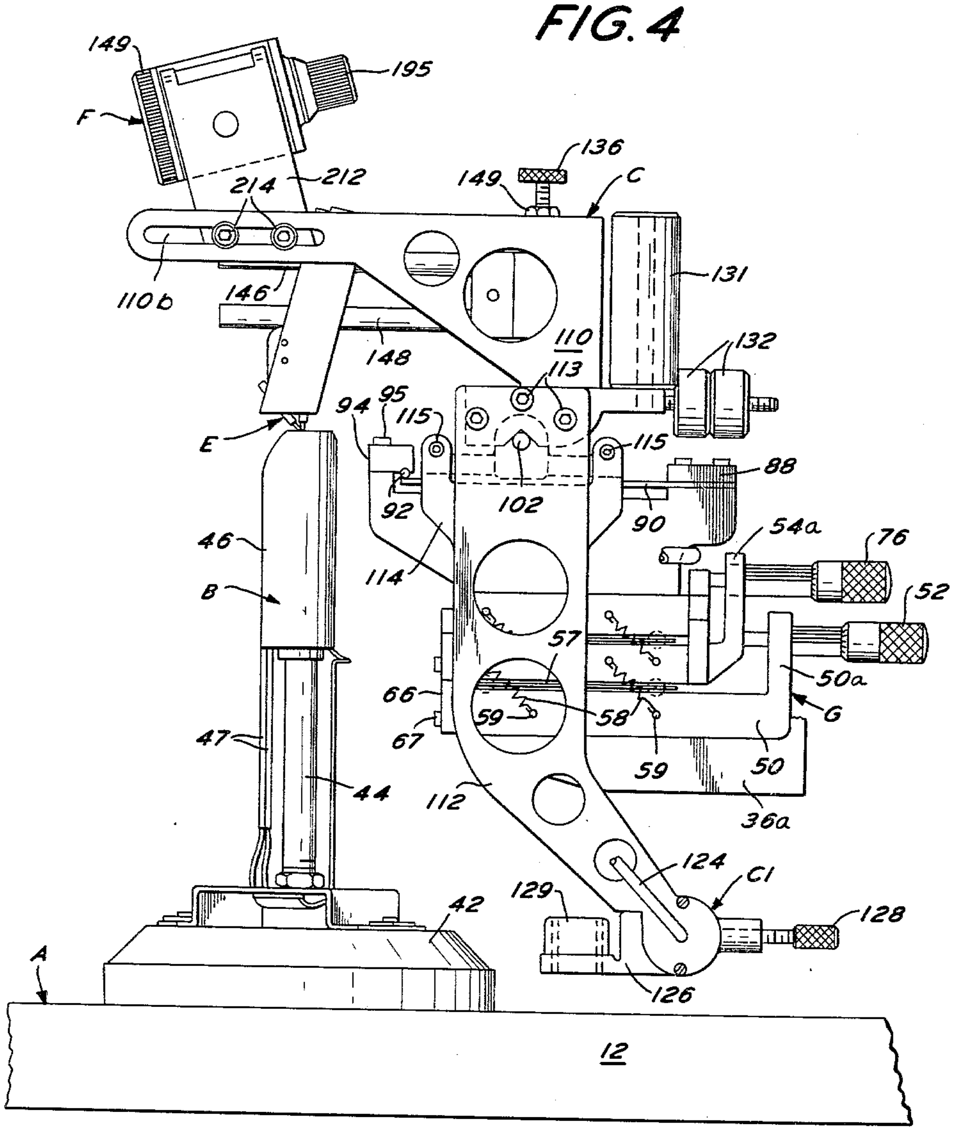
FIGURE 4 is a sectional view taken along lines 4—4 of FIGURE 3.
Figures 5, 6, 7:
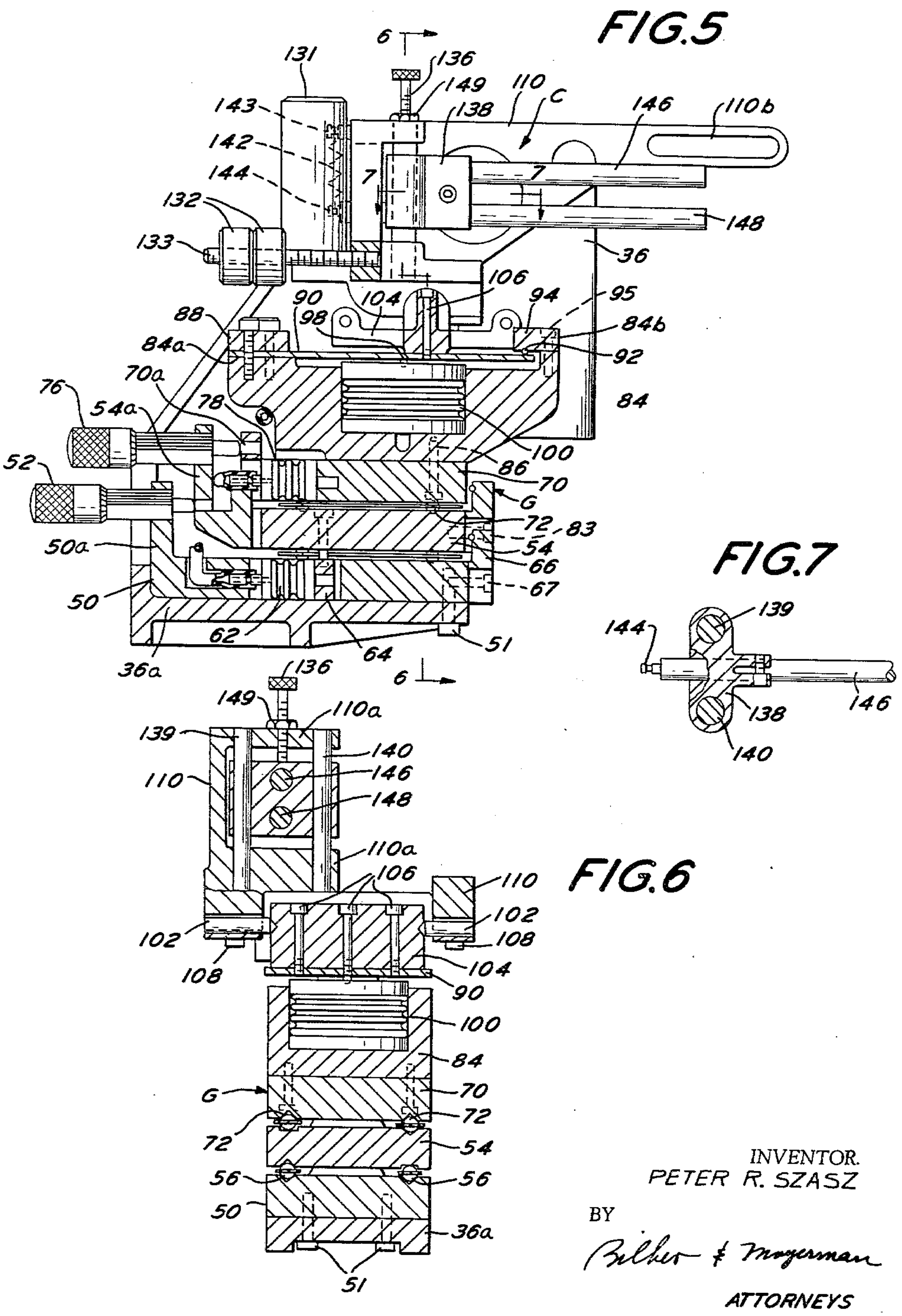
FIGURE 5 is a sectional view taken along lines 5—5 of FIGURE 3.
FIGURE 6 is a sectional view taken along lines 6—6 of FIGURE 5.
FIGURE 7 is a sectional view taken along lines 7—7 of FIGURE 5.

The horizontally-shifting platform G which supports the bonding head C is mounted upon a seat projection 36*a* of the bracket 36, as best shown in FIGURES 2, 4, 5 and 6. A base 50 is secured to the seat 36*a* by suitable screws 51, and an upwardly extending bracket 50*a* on the base has a micrometer 52 clamped by its barrel therein. A first stage 54 is slidably supported on the base 50 by balls 56 which ride in a pair of longitudinally-extending complementary raceways in the upper surface of the base and the lower surface of the first stage. Suitable ball separators 57 retain the balls 56 in spaced relationship with each other. Coil springs 58 tensioned between hanger pins 59 and 60 outwardly projecting from the respective lateral edges of the base 50 and the first stage 54 resiliently bias the latter from right to left as shown in FIGURES 2 and 5 so that first stage bracket 54*a* is urged into abutment with the spindle of micrometer 52. An air bellows 62 is mounted within a cavity in the base 50 and abuts against a toe plate 65 downwardly depending from the first stage 54. Actuation of the bellows 62 drives the first stage 54 from left to right as shown in FIGURES 2 and 5 against the bight portion of an inverted U-shaped limit stop 66 whose legs are secured to the end of base 50 by screws 67.

A second stage 70 is slidably supported on balls 72 which ride intermediate complementary spaced races in the lower surface of the second stage and the upper surface of the first stage. These races are parallel to the afore mentioned longitudinally extending raceways in the base and the lower surface of the first stage. Again, suitable ball separators retain the balls 72 in spaced relationship with each other. Coil springs 74 tensioned between the lateral edges of the two stages resiliently sandwich the balls 72 in the races therebetween. In addition, the springs 74 bias the second stage 70 from right to left (FIGURES 2 and 5) so that rest button 70*a* is urged into abutment with the spindle of micrometer 76 whose barrel is retained in first stage bracket 54*a*. An air bellows 78 mounted within the second stage 70 abuts a projection 80 upwardly extending from the first stage. Actuation of the bellows 78 drives the second stage from left to right on the first stage 54 against the bight of an inverted U-shaped limit stop 82 whose legs are secured to the end of the first stage by screws 83. In this manner, through appropriate adjustment of the micrometers 52 and 76, two separate and distinct horizontal movements of the second stage 70 with respect to the base 50 can be effected. The first movement occurs as a result of actuation of bellows 62 acting upon the first stage and acts through a predetermined distance by appropriate withdrawal of the first stage from the limit stop 66. The second discrete and independent movement occurs upon actuation of bellows 78 which returns the second stage 70 against limit stop 82 after initial displacement therefrom against micrometer 76.

Affixed to the top of the second stage slider 70 and held thereon by cap screws 86 is a bellows support block 84. A spring plate 90 is clamped at one end to a boss 84*a* which extends upwardly from the block 84, and a clamping bar 88 with screws 89 holds the spring plate in cantilevered position. The free end of the spring plate 90 abuts the lower surface of a ball 92 which is press fit within complementary drilled hole in spring support plate 94. The spring support plate 94 is secured by screws 95 to a second boss 84*b* on the support block 84. An air bellows 100 is mounted within a recess in the support block 84 so that the end cap of the bellows, in collapsed position, just contacts the under surface of the spring plate 90 through a dowel 98. Actuation of the bellows 100 by introduction of air under pressure therein causes axial expansion thereof against spring plate 90.

The spring plate 90 will therefore "bow" upwardly a predetermined amount. The deflection caused by the bow is adjustable (.000 to .004 inch) through regulation of the air pressure, the purpose being to elevate the bonding tool E initially by a minute controlled amount over the bonded wire after a bond has been made without pivotal motion of the tool. As will now be described, the bonding head C is pivotally supported upon the block 84, and the counter balanced head pivots on a trunnion 102 when the bonding tool E contacts the semi-conductor on depression of the Z-axis slider 40. However, when the bond is completed, it is necessary to lock the pivot (air clamp C1 and elevate the tool E (spring plate 90) with a pure vertical motion in order to avoid "scrubbing" or failure of the extremely fine wire.

Referring now to FIGURES 2, 3, 4, 5 and 6, a pivot support 104 is secured to a medial portion of the spring plate 90 by screws 106. The trunnions 102 are clamped by retainers 108 within V-grooves at the lower portion of tool support bracket 110. The trunnions 102 have conical points which engage conical depressions or bearings in opposed edges of the pivot support 104. Downwardly depending from one side of the tool support bracket 110 is a moving pivot locking arm 112. The locking arm 112 has at its lower extremity one-half of the pneumatic clamp C1 which is adapted to register with the other half of the clamp mounted on the toe of stationary pivot locking arm 114. The upper portion of the stationary pivot locking arm 114 is secured to one side of the pivot support 104 by cap screws 115, the upper portion of the moving pivot locking arm 112 being secured by screws 113 to the side of the tool support bracket 110, all as shown in FIGURE 4.

Figure 16:
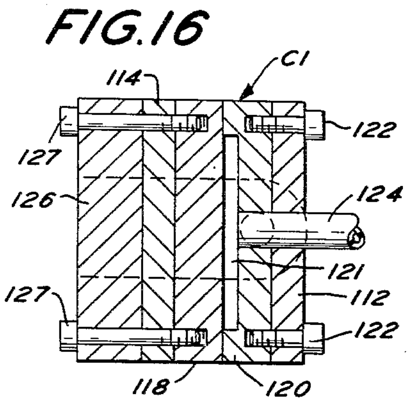
FIGURE 16 is a sectional view taken along lines 16—16 of FIGURE 2.

The pneumatic clamp C1 comprises a disk 118 which is secured to the exterior facing surface of the stationary pivot locking arm 114 and a brake pad 120 secured to the interior facing surface of the moving pivot locking arm 112. See FIGURE 16. The brake pad 120 is affixed to the moving arm 112 by screws 122 and has a circular recess 121 centrally disposed therein. The annular wall about the circular recess 121 has a highly polished face which is adapted to slidably register with the complementary lapped and polish face on the disk 118. Tubing 124 communicates with the circular recess 121 in the brake pad 120, and this tubing 124 is connected at the other end by a valve (not shown) in the console unit 16 either to a source of air under slight pressure or a vacuum line. When air is introduced into the recess 121, the disk 118 and the pad 120 will freely slide upon each other frictionlessly on a film of air which escapes at the interface. This will enable the tool support 110 to freely pivot about the trunnions 102. Such a freely pivotal action is desired when the Z-arm is depressed for bonding purposes so that the bonding tool E abuts the surface of the semi-conductor X.

When the circular recess is connected to the vacuum, the disk 118 will be sucked into locking engagement with the brake pad 120 and interlock the moving pivot locking arm 112 with the stationary pivot locking arm 114. As has been mentioned hereinbefore, interlocking of the tool support 110 is desired immediately after bonding so that accurate, pure, vertical elevation of the bonding tool E will occur during lift-off.

Also secured to the lower portion of the stationary pivot locking arm 114 is a pivot rest limit stop 126. Screws 127 extend through aligned apertures in the limit stop 126 and the locking arm 114 into threaded engagement with the disk 118. An adjusting rod 128 is threadedly engaged within the limit stop 126 so that the end of the rod is adapted to abut the exterior wall of the brake pad 120. It is the purpose of the adjusting rod 128 to "square the bonding tool E," that is to say define the lower limit of its arcuate motion so that a very nearly pure vertical loading force will be imposed by the bonding jewel E1 at the time it first contacts the work. Thus, counterclockwise rotation of the moving pivot lock arm 112 as shown in FIGURE 4 is limited by the abutment of brake pad 120 against the end of adjusting rod 128. This limit of counterclockwise rotation determines the rotational rest position of the bonding tool E as it is poised above the semiconductor device X preparatory to bonding. When the tool E is vertically depressed into contact with the semiconductor device by stepping upon treadle 221, the tool support bracket 110 together with its moving pivot lock arm 112 is caused to pivot or rotate clockwise. Accordingly, the pad 120 will be lifted off from its rest position away from the rod 128 during bonding. However, since the bonding load is pivotally imposed while the movement which causes the creation of that load is vertical, the small pivotal arc through which the bonding tool E swings during bonding must be substantially vertical in order to prevent the tool from "walking." Therefore, the rod 128 is so adjusted to abut the brake pad 120 at rest position (bottom of the arc) whereby the chord of the arc through which the bonding tool swings during bonding will be disposed essentially in a pure vertical direction. At this point the bottom of the jewel E1 coincides with a horizontal plane passing through the pivotal axis of the head C. The top portion of the arc through which the tool E may swing is restricted by establishing a bottom limit for the reciprocation of the head C through the programming means H, the latter being described in full detail hereinafter. In this manner, the portion of the arc through which the pivotally-supported bonding head will rotate is adjustably selected to provide minimum scrubbing action of the bonding tool with respect to the semi-conductor. Supported on the opposite end of the limit stop 126 is a microswitch 129 whose contacts may be utilized, for example, to actuate circuitry for a transfer machine (not shown) which will automatically move a new semiconductor device into position for lead bonding.

A pair of fixed counterweights 130 and 131 are secured to the rearward lateral portions of the tool support bracket 110, and adjustable counterweights 132 are threaded upon rod 133 projecting backwardly from transverse member 110*a*. These counterweights balance the frontal load of the dispenser F and the associated components of the bonding tool E so that the pivotal relationship of the entire bonding head C may be equilibriated.

Referring particularly to FIGURES 2, 5, and 6, a thumb adjusting screw 136 is vertically threaded through the upper portion of transverse member 110*a*. A tool slider block 138 is slidably mounted upon vertical guide dowels 139 and 140. The slider block 138 is urged upwardly against the screw 136 by a biasing spring 142 which is secured at its upper end to hanger pin 143 on the transverse member and at its lower end to hanger pin 144 extending from the slider block. Vertically spaced horizontal rods 146 and 148 project forwardly from the slider block 138 and support the tool or jewel mount assembly E at the free ends thereof. The entire jewel mounting assembly E is thus adapted to be vertically adjusted within the bonding head C by appropriate rotation of the thumb adjusting screw 136 against the slider block 138. A lock nut 149 secures the thumb screw 136 in position after the adjustment has been made.

Figures 14, 15:
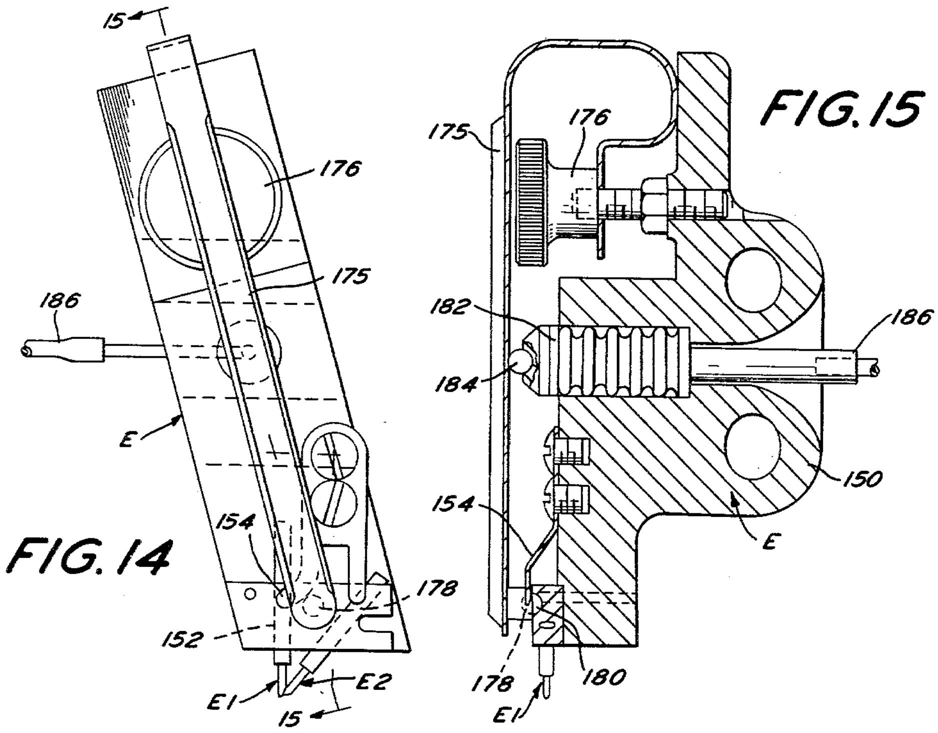
FIGURE 14 is a fragmentary elevational view of a bonding tool embodied in this invention.
FIGURE 15 is a sectional view taken along lines 15—15 of FIGURE 14.
Figure 18:
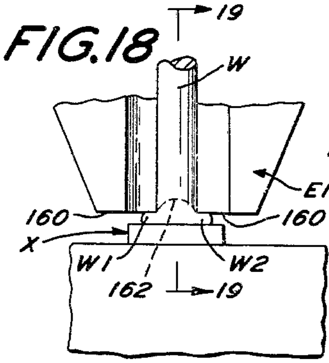
FIGURE 18 is a sectional view taken along lines 18—18 of FIGURE 17.
Figure 19:
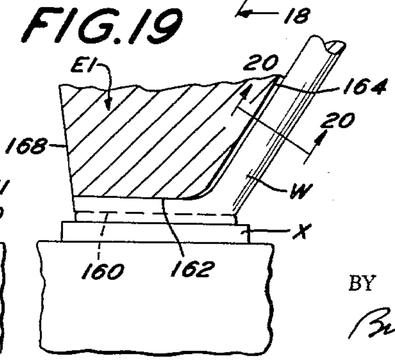
FIGURE 19 is a sectional view taken along lines 19—19 of FIGURE 18.
Figure 20:
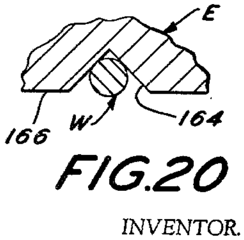
FIGURE 20 is a sectional view taken along lines 20—20 of FIGURE 19.

The jewel mounting assembly E is best shown in FIGURES 14 and 15 and comprises a mounting block 150 which supports a bonding jewel E1 and a wedge jewel E2. The bonding jewel E1 is a sapphire element which is pressed within a cylindrical shank 152 vertically retained in the block 150 by set screw 154. The lowermost portion of the jewel E1 has a flat surface which includes a pair of lands 160 disposed at opposite sides of a longitudinal groove 162. The groove 162 extends the full length of the lower bonding surface and terminates at the rearward end thereof in an upwardly sloping V-groove 164 in the oblique backface 166. The included angle which the backface 166 makes with the bottom surface 160 is approximately 58°30′. The depth of the V-groove 164 is just sufficient so that wire W will tangentially abut a projected plane defined by the surface 166. The angle included betwen the front face 168 and the bonding face 160 is approximately 95°. See FIGURES 18, 19 and 20.

Figure 17:
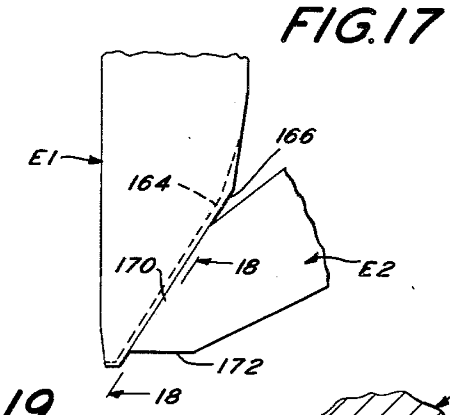
FIGURE 17 is an enlarged fragmentary view of the bonding tool shown in FIGURE 14.

The wedge jewel E2 is also formed of sapphire and is mounted within a shank 156 which is obliquely retained in the block 150. The wedge jewel E2 acts as a guide element for the wire W and has flat guiding face 170 which is sloped at an angle of approximately 7° from the axis of the wedge jewel. The lower flat face 172 of the wedge has an included angle of approximately 33° with the guide surface 170 and is positioned approximately $\frac{1}{16}$ inch above the level of the bonding face 160 in the bonding jewel E1. See FIGURE 17. This permits clearance for the wire W since the wedge jewel itself does not participate in application or bonding pressure but merely acts as a guide for retaining the wire against the V-groove 164 in the bonding jewel E1. It is to be pointed out that the guide surface 170 cooperates with the groove 164 in the bonding jewel E1. If the groove 164 is too deep, the wire W will shift axially therein and cause misalignment. If the groove 164 is too shallow, there will be excessive friction against the movement of the wire. It is particularly important that the degree of frictioning between the bonding and the wedge jewels is quite critical with wire sizes below .007 inch although it is essential that a slight amount of friction be present to straighten the wire. Note also that the wire W is gently curved around a radius of the intersection of the grooves 162 and 164 so as not to stress the wire at this point which would cause failure. It is to be further noted that when the bonding tool E1 with the wire lying in groove 162 is lowered into contact with the semiconductor, the pressure exerted by the lands 160 is sufficient to result in an outward flowing of the wire to form lateral wings W1 and W2 on opposite sides of the wire body. By controlling the weight or the load exerted by the bonding tool E, the degree of deformation of the wings W1 and W2, hence the thickness of bond area, may be controlled. The size and shape of the bond is thus determined by the wire diameter, shape and dimensions of the groove 162 and the length and width of the face of the jewel E1. The length of the bond is a function of the length of the jewel face, and several contiguous bonds can be made to extend the bond length.

Referring back to FIGURES 14 and 15, clamping means are provided on the jewel mounting assembly E to firmly grasp the wire W when it is desired to sever or tear the wire adjacent the bond. That is, the weakest cross-section of the wire W after bonding is immediately adjacent the bond. Therefore, when stress is applied to the wire by pulling it away from the bond, the wire will break next to the bond. Thus, by elevating the bonding mount E from the area just recently bonded and then clamping the wire W within the mount, drawing the said mount longitudinally away from the bond will cause the wire to break at the end of the bond without leaving a tab. A spring clamp 175 is secured at its curled end by a thumb screw 176 to the mounting block 150. A finger 178 having a "nylon" ball with a flat face universally rotatable therein is secured to the lower end of the spring clamp 175 and is adapted to abut a similar flattened nylon ball or clamping pad 180 universally supported within the mounting block 150. The wire W passes between the surfaces of the clamping pads 178 and 180 from the wire dispenser F on the centerline shown in FIGURE 14. The pressure or force exerted by the spring clamp 175 is sufficient to firmly grasp the wire between the flat surfaces. An air bellows 182 is mounted within the mounting block 150 so that the ball nose 184 just abuts a medial portion of the spring 175. The air bellows 182 communicates by way of tubing 186 to a source of air under pressure through a valve (not shown) in the control unit 16. Actuation of the valve causes the bellows 182 to axially expand against the spring so as to release the pressure of clamp pad 178 against the wire W. It is to be observed that the bellows 182 is normally actuated so as to permit the wire to freely slide through the clamp pad for feeding to the bonding jewel E1. It is only when the air pressure to the bellows is cut off that the clamping action of the pad 178 against the wire W occurs.

Figures 8, 10:
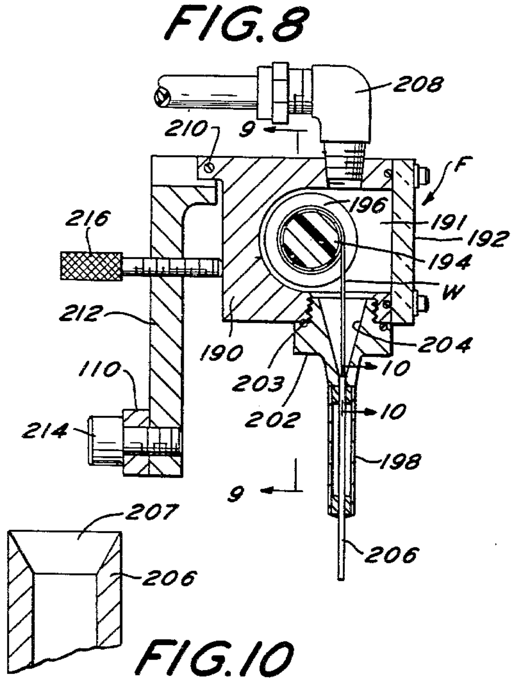
FIGURE 8 is a sectional view taken along lines 8—8 of FIGURE 3.
FIGURE 10 is fragmentary sectional view taken along lines 10—10 of FIGURE 8.
Figure 9:
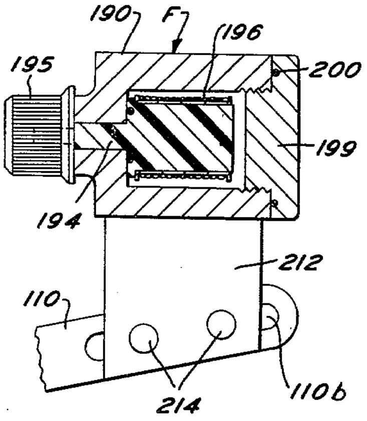
FIGURE 9 is a sectional view taken along lines 9—9 of FIGURE 8.

The dispensing head F is best illustrated in FIGURES 8, 9 and 10 and comprises a substantially rectangular housing 190 having a centrally disposed chamber 191 therein. The face of the chamber 190 has a transparent plate 192 secured thereto so that wire loading, threading and unspooling operations will be clearly visible to the operator. A "Teflon" pintle 194 is rotatably supported in the housing 190 and is adapted to be turned in either direction by a knob 195. A spool 196 upon which the fine wire W is wound is mounted upon the pintle 194 so that the wire may be dispensed through feed tube 198. Access to the interior of the housing 190 is obtained by removing cap plug 199 which is detachably threaded within the housing. O-ring 200 in the plug forms a hermetic seal for the chamber 191. It is to be observed that the capping plug 199 has a knurled periphery to facilitate attachment and removal thereof. Where extremely fine gauge wire, in the range of 0.4 to 0.7 mil, is to be dispensed from the head F, a special low-mass spun-aluminum spool weighing approximately ½ gram is employed. The feed tube 198 has a kurled knob 202 which is threaded into a lower opening in the housing 190 and forms a seal therewith by O-ring 203. The interior of the plug portion 202 has a conically flared orifice 204 that defines an entrance funnel which facilitates the threading of the wire W into the bore of hypodermic needle tube 206 which is concentrically spaced within the feed tube 198. The upper portion of the hypodermic tubing 206 has a conically flared orifice 207, as shown in FIGURE 10, so that extremely fine gauge wire can be threaded with facility therein. The hypodermic needle 206 is #25 gage and interfits within the feed tube 198 which is #11 gage. A reducing gas, such as nitrogen, is introduced into the housing chamber 191 through a fitting 208 in order to further facilitate threading of the wire W and to prevent contamination of the wire after the spool 196 has been loaded upon the pintle 194.

The housing 190 is pivotally supported at 210 to a support arm 212, the support arm being adjustably positioned within the tool support bracket 110 by screws 214 which extend through longitudinal slot **110*b* therein. The correct degree of angular disposition of the feed tube 198–206 is obtained by appropriate adjustment of thumb screw 216 which threadly engages arm 212 and abuts the housing 190**.

It is important to observe that the low-mass spun-aluminum spool freely rotates on the pintle 194 as the bonding operation draws the wire therefrom. In the loading operation, the knob 195 is rotated to advance the wire W through the feed tube 206 upon a film of gas. However, the friction and mass of the spool 196 on the pintle 194 is less than rotational friction and mass of the pintle, including knob 195 in the housing 190. As a consequence, the spool 196 will overrun on the pintle during bonding and thereby minimize the friction and inertia which might otherwise cause failure of the extremely fine wire.

As has been set forth hereinbefore, the application of the bonding force is by a dead-weight system wherein the bonding head C pivots about the trunnion 102 when the bonding tool E1 is urged against the semi-conductor device X. Since the bird beak bonding instrument is adapted to readily bond to a terminal post or the wafer itself, the two being at a different elevation, there is a need to limit the lower most position of the bonding tool E1 in each instance in order to prevent excessive pivotal rotation of the bonding head C. That is, the angle through which the bonding head C pivots must be carefully controlled in order to prevent a "scrubbing" action of the bonding tool E1 or other distortion in the nature of the bond itself. In the system disclosed herein, the lowermost or "bottoming" position is also utilized as a reference position from which the bonding tool is elevated by spring plate 90 after the bond has been completed so that the bonding jewel E1 will be raised just clear of the bond. This is most important in retaining the wire W in the groove 162, as will be set forth hereinafter. First, the vertically-reciprocable bonding head C is lowered by depression of either a foot treadle 221 which is located at floor level under the table top 12 or by an actuating hand lever (not shown), as fully described and set forth in the Patent No. 3,149,510 hereinbefore cited. Thus, Z-axis slider 40 (FIGURE 3) is depressed against the bias of coil springs 41 which are tensioned between the upper portion of the manipulator housing 30 and the head support bracket 36 by drawing actuating cord 220 downwardly with the foot treadle 221.

Figure 11:
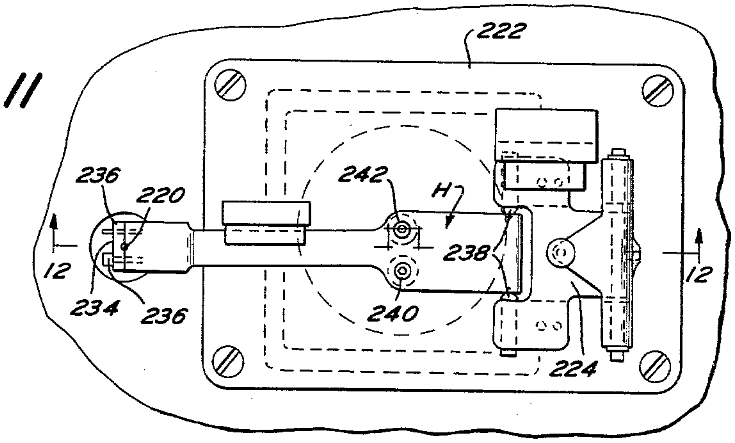
FIGURE 11 is a top plan view of a programming head embodied in this invention.
Figure 12:
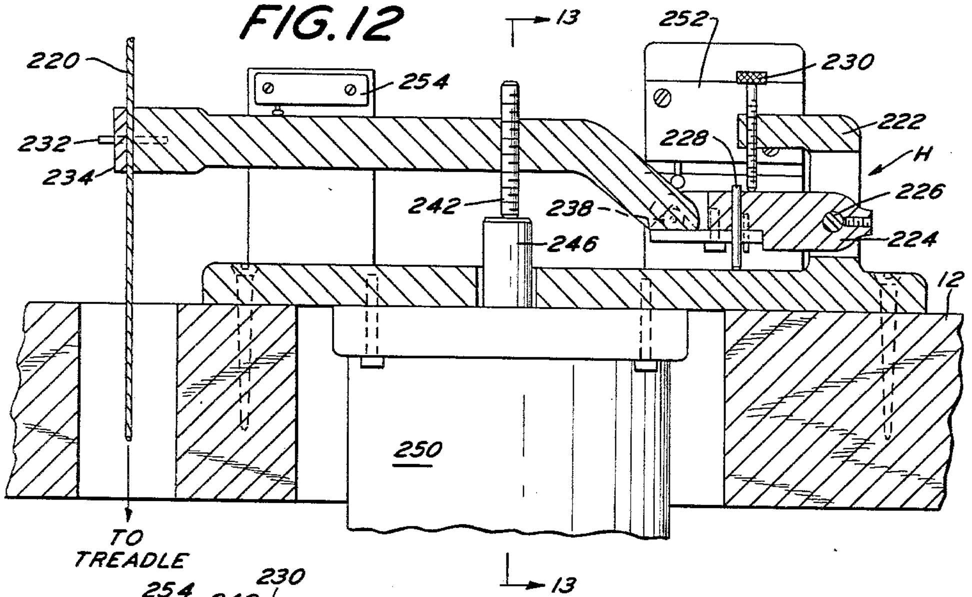
FIGURE 12 is a sectional view taken along lines 12—12 of FIGURE 11.
Figure 13:
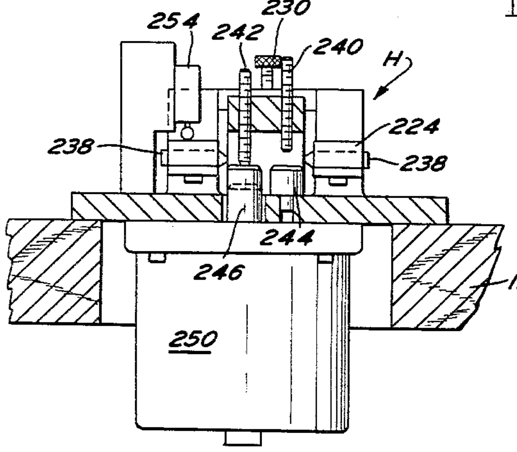
FIGURE 13 is a sectional view taken along lines 13—13 of FIGURE 12.

Referring now to FIGURES 11, 12 and 13, the bottoming action of the bonding head C, either at the terminal post or the wafer of the semi-conductor X, is accomplished by the programming assembly H. The programming head H comprises a housing bracket 222 which is affixed to the table top 12 by suitable screws. A toggle link 224 is pivotally supported within bracket 222 upon a shaft 226. Counterclockwise rotation of the toggle link 224, as shown in FIGURE 12, is limited by an adjusting screw 228 which is threaded therein and is adapted to rest upon the surface of the bracket 222. Clockwise rotation of the toggle link 224 is limited by a thumb screw 230 which is threaded within and downwardly depends from an upper portion of the bracket 222.

A lever arm 232 is clamped at its outer end to the actuating cord 220 by jaw 234 and set screws 236, the inboard end of the lever arm being pivotally supported upon conical bearing points 238 secured within the free ends of the toggle link 224. The fulcrum of the lever arm 232 is either a "LO" bottom limit screw 240, which represents the "dice" position, or "HI" bottom limit screw 242, which represents the "post" position, both of which are adjustably threaded within the lever arm. The "LO" limit screw 240 is adapted to abut a button 244 which projects above the surface of the bracket 222. The "HI" limit screw 242 is adapted to abut button 246 which is secured to the actuating rod of a solenoid 250. Actuation of the solenoid 250 will cause the button 246 to extend upwardly whereupon the bottom of the "HI" limit screw 242 will be in abutment therewith, and "LO" limit screw 240 will be spaced from button 244. Correspondingly, when the solenoid 250 de-energizes, the button 246 will be lowered and withdrawn from contact with screw 242, and "LO" limit screw will rest upon button 244. Thus, depression of the cord 220, and hence the bottoming of the bonding tool E1, occurs when the limit screws 240 or 242 strike their respective rest buttons 244 and 246. The solenoid 250 has an oil-damped action in order to quiet the operation. The screws 240 and 242 are adjusted during initial set-up so that thereafter the operation may be continued on identical semi-conductor headers.

It is to be observed that when the cord 220 is depressed beyond a certain point, the arm 232 will rock about the appropriate limit screw since the inboard end of the lever arm is pivoted in the toggle link 224. This will cause the toggle link 224 itself to pivot upwardly until it abuts the thumb screw 230. However, the upper surface of the toggle link 224 will first abut the contactor of "cycle start" microswitch 252 which is mounted on the bracket 222 and whose contacts are normally open. The thumb screw 230 thereby acts as a stop to prevent the microswitch 252 itself from acting as a "constructional" limit. Closing of the contacts of the "cycle start" microswitch 252 initiates the operation of either the "LO" position timer 18 or "HI" position post timer 20, as shown in the circuit diagram of FIGURE 21. This will initiate a series of automatically controlled events which will now be described in detail. When the cycle is completed, the lever arm 232 will be drawn upwardly by the cord 220 into abutment with the contactor of a "cycle reset" microswitch 254 which is also mounted on the programmer bracket 222. This will close the contacts of the cycle reset switch 254 and recycle the controls preparatory to the entire sequence of operation.

Figure 21:
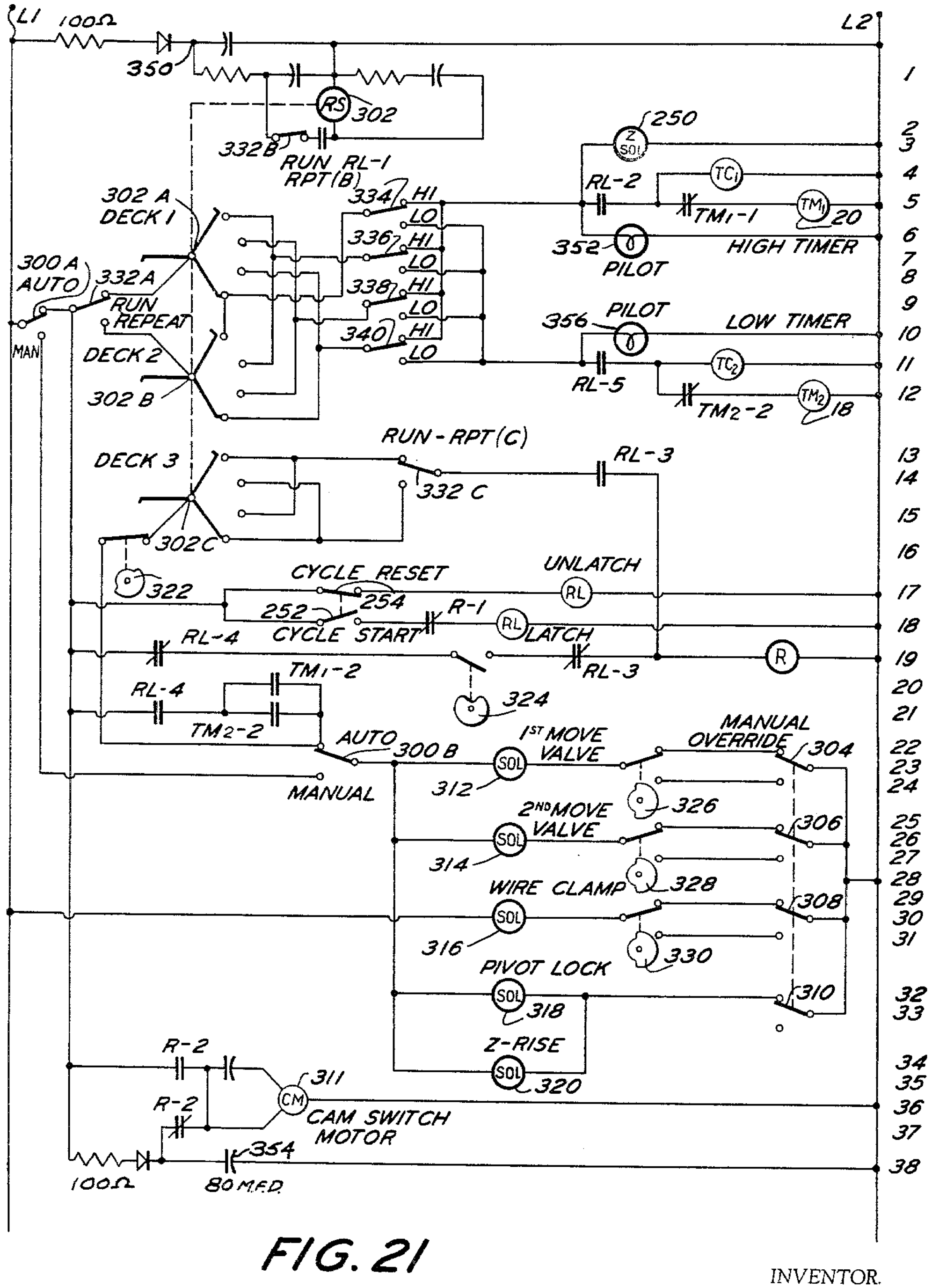
FIGURE 21 is a schematic diagram of the programming circuit embodied in this invention.

Referring now to the mode of operation of the instant invention, and particularly to the circuit diagram of FIGURE 21, the sequence is adapted for either manual or semi-automatic operation. An automatic-manual switch 300 is provided on the control panel 16 so that the operator can conveniently switch either mode. In the circuit diagram of FIGURE 21, there is indicated two sections of the switch 300, these being designated "A" and "B" to indicate that they are ganged. All relays and electrical circuit components are shown in the across-the-line diagram even though they may be remotely located. In order to correlate the location of the actuating coils and contacts, a marginal key has been employed. The diagram has been accordingly divided into horizontal bands which are identified with the line numbers in the right hand margin adjacent the vertical line L2, L1–L2 representing a 120 volt, 60 cycle, A.C. supply. Relay, solenoid and holding coils are identified by encircled letters in the particular horizontal line.

The timers 18 (dice) and 20 (post) are set manually for the desired duration of the bonding pulse, these times being obtained experimentally after a set-up run. The automatic-manual switch 300 is thrown into manual position for example.

The manual position of selector switch 300 disengages the power to the three decks of a stepping selector 302. See horizontal line #8 of FIGURE 21. Accordingly, the timers 18 (line #5) and 20 (line #12) cannot be energized. In addition, the bottom limit Z-solenoid 250 (line #3) will remain de-energized so that the "LO" bottom limit screw 240 in the lever arm 232 of the programmer head H will be free to abut button 244. Therefore, the operator will come down with the bonding head C and will determine the bonding contact of the jewel E1 at the post only by "feel" in the manual position. Observing that the "auto-man" selector 300B (line 23) still maintains the solenoids which control the actuation of the horizontal drive platform G, the wire clamp bellows 182, the pivot lock C1 and the Z-rise bellows 100, across the line, a series of manual override switches 304, 306, 308 and 310 are provided for manual actuation of these circuits under certain conditions. That is, the manual override switches are not only used to permit set-up adjustment of the various components, but also to incorporate particular circuits for performance of a certain operational sequence. Note also the 300A section (line 9) of the "auto-man" switch has disconnected cam switch motor 311 (line 36) so that the cams 326, 328, and 330 maintain their respective switch elements in their lower contacting position. Accordingly, only the manual override switch 310 is depressed in "manual" position initially so that the pivot lock solenoid 318 and the Z-rise solenoid 320 are out of circuit.

In order to make a "manual" bond without wire cut-off, the operator depresses the treadle. When the bond is complete, manual override switch 310 is elevated, if desired, so that the pivot lock solenoid 318 actuates the valve which applies vacuum to the pivot clamp C1. Immediately thereafter, the Z-rise solenoid 320 actuates bellows 100 to "bow" the spring plate 90 upwardly. The entire bonding head C will be elevated and the jewel E1 will just lift-off from the bond a predetermined amount with a pure vertical motion.

The operator then releases the treadle and manipulates the jewel E1 to a second point by the micropositioner D. The treadle is again depressed and the following manual sequence is followed if the wire W is to be cut-off upon completion of the second bond. First, with the treadle depressed, the manual override switch 310 is elevated, thereby locking the pivot C1 and elevating the jewel E1 through the pivot lock solenoid 318 and the Z-rise solenoid 320. Secondly, the manual override switch 304 is depressed so that 1st move solenoid 312 is energized and actuates bellows 62. The first stage slider 54 is thereby horizontally shifted a predetermined distance, approximatey the length of the bonding surface of the jewel E1. The jewel E1 will accordingly be drawn backwardly and enable the groove 162 to be filled with wire for a subsequent bond. Next, the override switch 308 (line #30) is depressed so that the wire clamp solenoid 316 is energized. Bellows 182 in the jewel mount E is withdrawn from contact with the tubular spring 175. Therefore, the dispensed wire W will be securely clamped within the pads 180 and 182. Finally, override switch 306 (line #26) is depressed and thus energize 2nd move solenoid 314. This will actuate bellows 78 and shift the second stage slider 70 a sufficient distance to tear the wire. Since the wire W is clamped within the jewel mount, the second movement will cause the wire to break at the weakest point. Accordingly, failure will occur immediately at the end of the bond where the dispensed wire was adjoined. Hence, there will be no tab, and the bond can be cut-off either at the wafer or the terminal post. The manual override switches are then returned to their initial position preparatory to another bonding sequence.

In automatic operation, the timing sequence and the "bottoming" in high and low positions are programmed to a pre-set arrangement. The "auto-man" selector switch is thrown to automatic position and the timers 18 and 20 are each set for a certain period. The "run-repeat" switch 332 is put in "run" position, and the programmer selector switches 334, 336, 338 and 340 are set in their desired "HI" or "LO" positions. For example, if the sequence desired on a particular semi-conductor device is to couple a terminal post to a wafer stripe and then couple a second stripe to a second terminal post, selector switch 334 is set to "HI," 336 to "LO," 338 to "LO" and 340 to "HI."

Turning the main power switch (not shown) to "ON" energizes double voltage rectifier unit 350 which supplies D.C. power for stepping relay 302. The wire clamp solenoid energizes through cam switch 330 and manual override switch 308. "HI" pilot light indicator 352 energizes through auto-man switch 300A, run-RPT switch 332A, home contact of stepping switch 302 in deck #1, and the "HI-LO" selector 334. The A.C. cam switch motor 311 is braked to a stop since capacitor 354 is charged with D.C. through resistor and rectifier, the D.C. being applied to the cam motor through the now closed R–2 contacts in line 37.

The bonding jewel E1 is first manipulated to a post and the treadle 221 depressed until the lever arm 232 bottoms, i.e., screw 242 will abut the button 246 since the Z-solenoid 250 (line 3) is energized. Pressing the treadle 221 opens cycle-reset switch 254 and closes cycle-start switch 252. Relay RL latches and all RL contacts transfer. Contact RL–1 (line 3) closes to energize the stepping solenoid 302 and "cock" the stepping mechanism. Contacts RL–2 (line 5) and RL–5 (line 11) close to timers 18 and 20 but only timer 20 is energized since selector switch 334 is in "HI" position. Contacts RL–3 (lines 13 and 19) transfer without effect since one circuit is open at stepping switch 302C (deck 3) and the other at cam switch 324. Contacts RL–4 (lines 19 and 21) transfer to energize the timer output switches.

After a preset time, the "HI" timer 20 times out and closes contact TM1–2 (line 20) thereby energizing the pivot lock solenoid 318 and the Z-rise solenoid 320 through auto-man switch 300A and B and manual override switch 310. Accordingly, vacuum will be applied to lock the pivot C1 and the bellows 100 will bow the spring plate 90 upwardly so that the bonding jewel E1 will automatically just lift-off the bond.

At this point, treadle 221 is raised whereby cycle-start switch 252 opens and cycle-reset switch 254 closes. Therefore the unlatching relay R1 (line 17) will be energized, and transfer the RL contacts. RL–1 opens and stepping switch 302A, B and C rotates one step to the second position. Contacts RL–2 and RL–5 open to the timers 20 and 18 respectively. Contacts RL–3 (lines 13 and 19) transfer and connect relay R (line 19) to cam switch 324. Contacts RL–4 (lines 19 and 22) transfer and de-energize the timers, the pivot lock solenoid 318 and the Z-rise solenoid 320.

When the stepping switch 302 progresses one step for the second bond, the selector switch 336, having been set to "LO" position, will energize the "LO" pilot lamp indicator 356 preparatory to making a second bond on the wafer. Stepping switch deck #3 (302C) is now closed. The Z-solenoid 250 and the "HI" pilot lamp 352 will be de-energized. The programmer button 246 will be out of position so that botttoming screw 240 may abut the "LO" position button 244. The bonding jewel E1 is manipulated over to the point in the wafer at which the second bond is to be made and the treadle 221 depressed until the lever arm 232 bottoms. Cycle-reset switch 254 opens and cycle-start switch closes. Since selector switch 336 is in "LO" position the "Lo" timer 18 will be energized. After a preset time, the timer 18 will time out solenoid 318 and the Z-rise solenoid 320 are energized as before. However, relay R (line 19) is now energized through the now closed RL–3 (line 14), the stepping selector 302C and back through the now closed and close contacts TM2–2 (line 21). The pivot lock TM2–2 contacts.

As the relay R is energized, contact R–1 (line 18) opens in the cycle start circuit. Contacts R–2 (lines 35 and 37) transfer, thereby disconnecting the D.C. braking circuit and connect A.C. line voltage to cam switch motor 311. Meanwhile, the capacitor 354 recharges to peak line voltage through the rectifier (line 38). Accordingly, the cam switch motor 311 will turn and the following will occur in sequence: First the 1st move solenoid 312 is energized through cam switch 326 causing the bellows 62 to move slider 54 a predetermined distance so that the groove 162 in the slightly raised tool E1 can refill with wire. Next, the wire clamp solenoid 316 is energized through cam switch 330 causing the bellows 182 to be released so that the wire W will be clamped between pads 178 and 180. Thirdly, the 2nd move solenoid 314 is energized causing the bellows 78 to move the second stage slider 70 a sufficient distance to break the clamped wire W at the bond.

Cam switch 322 will then open and de-energize relay R. When relay R releases, contact R–1 (line 18) is closed in the cycle-start circuit. Contacts R–2 (lines 35 and 37) transfer and switch cam motor 311 from A.C. line voltage to recharged capacitor 354. This provides instant braking action for the cam motor, and then reduced D.C. continues across the motor terminals.

When the foot treadle 221 is raised, the cycle-start switch 252 again opens and cycle-reset switch 254 closes. This unlatches relay RL in line 17. Contact RL–1 opens, and stepping switch 302 is rotated to the third step whereby selector 338 is across the line ("LO" position). When the RL–4 contacts transfer, relay R is re-energized through the now closed cam switch 324 for reset of the cam programmer. Contact R–1 (line 18) re-opens in cycle-start circuits to insure full indexing of the cam programmer before starting the third bond. Contacts R-2 transfer, thereby disconnecting braking D.C. and connecting A.C. line voltage through the cam switch motor 311, and the motor drives the cam programmer back to "home." Meanwhile, capacitor 354 recharges as before. As the cam programmer turns the following occurs: Cam switch 326 de-energizes the first move solenoid 312. Cam switch 328 de-energizes the 2nd move solenoid 314. Cam switch 330 de-energizes the wire clamp solenoid 316. Cam switch 322 recloses, but the line is still open through stepping switch 302C (deck #3). Cam programmer switch 324 opens at index position, thereby releasing relay R.

The third bond repeats the first bond, except that, as programmed through selector switch 338, it will be performed at the wafer. That is, all operations of the third bond will be performed at the "LO" position rather than at the "HI" position at the post of the first bond. Consequently, cut-off will not occur at the third bond. Similarily, the fourth bond repeats the second bond, except that it will occur at the post, and cut-off will occur through the cam programmer sequence as in the case of the second bond. It is to be observed that the machine is now ready to start another bonding cycle.

If a bond has been performed unsuccessfully at any portion of the cycle, the run-repeat switch 332 is thrown to "repeat" position. In this switch, section 332A shifts to deck #2 of the stepping switch 302, and in effect returns the setting switch 302 back one step. Section 332B opens the stepping circuit so that the stepping switch cannot advance. Section 332C shifts the wire break sequence back to be repeated again with repeat bonding of second and fourth bonds. It is to be noted that the wire will not break when it is not bonded even though the programming goes through the wire break steps. This is so because the wire will only break after a bond has been made since severing of the wire occurs when the wire is pulled away from the bond. When the repeat switch is depressed, the bonding sequence thereafter repeats exactly as before except that the stepping switch does not operate. When the bond is successful, the run-repeat switch 332 is then thrown to "run," and the operation continues in a normal sequence.

It is to be noted that the distance which the tool E1 moves (2nd move) as it severs the wire is not critical so long as it moves far enough to break it. The 1st motion which immediately preceeds the 2nd move is critical, however, since it is this motion which enables the groove in the bonding tool to be "loaded" or filled so that, after the wire is severed, a proper length of wire lies under the jewel's bonding surface for first bond of the subsequent series. The length of this first motion is always preset before using the instrument.

It is to be observed that the bonding tools E1 and E2 have been indicated as being preferably sapphire jewels. However, carbide and carbon steel tools, as well as other materials, can be substituted for this purpose and are within the contemplation of the instant invention. Furthermore, while the bonding head C has been shown and described herein as being vertically reciprocable, it may easily be seen that other motions may be equally applicable, as for example were the semiconductor X rotated through a right angle and mounted vertically.

Although this invention has been described in considerable detail, such description is intended as being illustrative rather than limiting, since the invention may be variously embodied, and the scope of the invention is to be determined as claimed.

What is claimed is:

1. A bonding instrument for thermocompressively securing lead wire to semiconductor devices comprising a frame, a bonding head vertically reciprocable in said frame, a bonding tool mounted in said bonding head and having a groove at the bottom surface for carrying the wire to be bonded, dispensing means delivering wire to the groove in said bonding tool, means to depress said bonding tool so that the wire carried in the groove thereof will be urged into contact with the semiconductor, first bottoming means to limit the lowermost position of said bonding tool at a first location of the semiconductor, second bottoming means to limit the lowermost position of said bonding tool at a second location on the semiconductor, means to automatically elevate said bonding tool after a second bond has been made a predetermined relatively small distance so that the tool will be just clear of the bond, means automatically shifting said bonding tool a predetermined distance along a horizontal line axially with respect to the groove thereof after the elevation in order to refill the groove with wire, means thereafter clamping the wire in said bonding head, and means shifting said bonding tool a sufficient distance to tear the wire whereby the wire will be severed immediately adjacent the second bond without leaving a tab thereon.

2. The invention of claim 1 including means to pivotally support said bonding head whereby a pivotally-applied loading force will be exerted by said tool against the wire being bonded.

3. The invention of claim 2 including means to lock said pivotal support means automatically at the termination of each bond whereby said bonding tool will lift off with pure vertical motion as said bonding head is elevated.

4. A bonding instrument for thermocompressively securing lead wire to semiconductor devices comprising a frame, a bonding tool vertically reciprocable in said frame, said bonding tool having a groove in the bottom surface thereof for carrying wire to be bonded, dispensing means delivering wire to the groove in said bonding tool, means to depress said bonding tool so that the wire carried in the groove thereof will be urged into contact with the semiconductor for thermocompressive bonding therewith, bottoming means to limit the lowermost position of said bonding tool so that a predetermined bottom reference surface will be defined, means to elevate said bonding tool a predetermined relatively small distance after a bond has been completed so that the tool will raise just clear of the bond, means to shift said slightly elevated tool a predetermined distance along a horizontal line axially with respect to the groove thereof so as to refill the groove with wire, means thereafter clamping the wire in said bonding tool, and means shifting said tool a sufficient distance to tear the clamped wire whereby the wire will be severed adjacent the bond without leaving a tab.

5. A bonding instrument for thermocompressively securing lead wire to semiconductor devices comprising a frame, a bonding tool vertically reciprocable in said frame, means to limit the depression of said tool at a lower wafer position on the semiconductor, means to limit the depression of said tool at an upper post position on the semiconductor, and programming means selectively actuating said limiting means whereby uniform and consistent bonds may be performed at the wafer and the post in a predetermined sequence.

6. A bonding instrument for thermocompressively securing lead wire to semiconductor devices comprising a frame, means vertically reciprocable in said frame, a bonding head pivotally supported in said reciprocable means, a bonding tool supported in said bonding head at a position horizontally spaced from the pivotal axis thereof, said tool having a groove in the lower surface thereof, means to depress said reciprocable means so that said bonding tool is urged into contact with the semiconductor device, and stop means to limit the downward travel of said reciprocable means to a position at which said bonding head will pivot only through a small predetermined angle after said tool is urged against the semiconductor device whereby a uniform bonding force will be imposed upon wire carried by said tool without scrubbing.

7. The invention of claim 6 including adjustable pivot rest means on said bonding head for orienting the bottom of said bonding tool in a horizontal plane passing through the pivotal axis so that the pivotally-applied bonding force imposed by said tool will be substantially vertical with the pressure uniformly distributed thereby in forming the bond.

8. A bonding instrument for thermocompressively securing lead wire to semiconductor devices comprising a frame, a pivotally supporting bonding head vertically reciprocable in said frame, a bonding tool supported in said bonding head horizontally-spaced from the pivotal axis thereof, means to depress said bonding head so that said bonding tool will move through a small arc after being urged against the semiconductor device and apply a predetermined pivotally-applied force upon lead wire sandwiched therebetween, means to lock the pivotal motion of said bonding head after the bond has been completed, and elevating means to raise said bonding head a predetermined distance above the bond so that said bonding tool will lift off from the bond with pure vertical motion.

9. The invention of claim 8 wherein said elevating means comprises a horizontally-disposed elastic member, and means for resiliently distorting said elastic member and causing the same to bow upwardly against said bonding head so that the deflection thereof will just raise said tool clear of the bond.

10. A bonding instrument for thermocompressively securing lead wire to semiconductor devices comprising a frame, a bonding tool vertically reciprocable in said frame and having a groove at the bottom surface thereof for carrying wire, dispensing means for delivering wire continuously to the groove, means for depressing said bonding tool so that the wire carried therein will be thermocompressively urged into abutment with the semiconductor device, and adjustable means to orient the bottom surface of said tool in a plane parallel to the surface of the semiconductor device so that the bonding pressure will be uniformly distributed against the wire without scrubbing.

11. The invention of claim 10 including means automatically lifting said tool a predetermined distance just clear of the bond upon completion thereof so that fresh wire being dispensed to the groove will be retained in guided relationship therewith under full control without the danger of being lost.

12. A bonding instrument for thermocompressively securing lead wire to semiconductor devices comprising a frame, a horizontally-shiftable platform vertically reciprocable in said frame, a bonding head, means pivotally supporting said bonding head about a horizontal axis on said platform, a bonding tool secured within said bonding head, dispensing means in said head delivering wire to said tool, means to depress said platform until the wire under the tool is pressed into bonding contact against the semiconductor device with a predetermined pivotally-applied load, and means automatically locking said pivotal supporting means at the completion of the bond and elevating said bonding head a small predetermined distance so that said tool will be raised from the bond with a pure vertical motion.

13. The invention of claim 12 including means to displace said platform along the longitudinal axis of the wire under said tool a distance slightly greater than the length of the bond, means to clamp the wire being dispensed to said tool, means to shift said platform after the wire is clamped a further predetermined distance along the axis of the wire under said tool sufficient to tear the wire at the bond, and means to automatically program the sequence of said clamping means and said last-mentioned platform shifting means at the completion of any bond.

14. In a bonding instrument for thermocompressively securing lead wire to semiconductor devices, a tool mount assembly comprising a vertically reciprocable member, a needle-shaped bonding jewel vertically disposed in said member and having a wire-carrying groove in the sole thereof medially oriented between opposed land bonding surfaces, means to dispense wire continuously to the groove, means to depress said jewel and urge the wire into thermocompressive bonding abutment with the semiconductor device until the wire flows under the land bonding surface, means to clamp the wire being dispensed, means to withdraw the jewel away from the bond whereby the wire will be severed immediately adjacent the bond, and programming means for automatically actuating said clamping means at the termination of any bond in a predetermined lead bonding sequence, wherein said clamping means comprises a pair of pads supported in said member adjacent said jewel and sandwiching the dispensed wire therebetween, and ball joint means supporting one of said pads so that the latter pad will become self-aligned as the wire is clamped.

References Cited by the Examiner

UNITED STATES PATENTS

| | | | |
|---|---|---|---|
| 2,111,471 | 3/38 | Henkes | 90—58 |
| 2,707,823 | 5/55 | Sowter | 29—470.1 |
| 3,046,006 | 7/62 | Kulicke | 269—60 |
| 3,051,026 | 8/62 | Costa | 78—82 |
| 3,083,595 | 4/63 | Frank | 78—82 |
| 3,101,635 | 8/63 | Kulicke | 29—470.1 |
| 3,116,655 | 1/64 | Esopi | 78—82 |
| 3,125,906 | 3/64 | Johnson | 78—82 |
| 3,128,649 | 4/64 | Avila | 78—82 |
| 3,149,510 | 9/64 | Kulicke | 78—82 |

CHARLES W. LANHAM, *Primary Examiner.*

WILLIAM J. STEPHENSON, *Examiner.*